Harrigan & Whitney.
Worm for Gears.

N° 73095. Patented Jan. 7, 1868.

Witnesses
Inventors
Dennis Harrigan
Joel Whitney

United States Patent Office.

DENNIS HARRIGAN AND JOEL WHITNEY, OF WINCHESTER, MASSACHUSETTS.

*Letters Patent No. 73,095, dated January 7, 1868.*

IMPROVEMENT IN WORM FOR GEARS.

*The Schedule referred to in these Letters Patent and making part of the same.*

TO ALL TO WHOM THESE PRESENTS MAY COME:

Be it known that we, DENNIS HARRIGAN and JOEL WHITNEY, both of Winchester, in the State of Massachusetts, have invented an improved form of Worm for Gears; and we do hereby declare the following is a full and exact description thereof, reference being had to the accompanying drawings, and to the letters of reference thereon.

Figure 1:
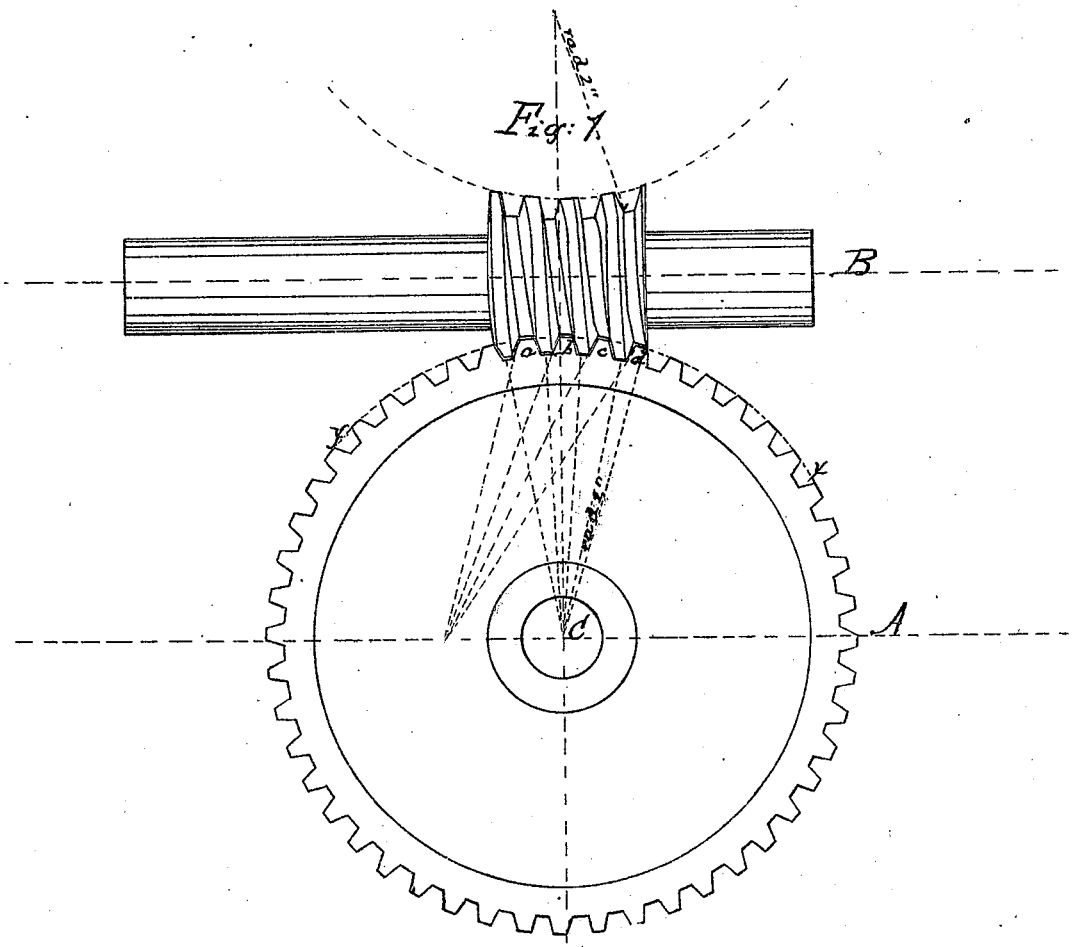
Figure 2:
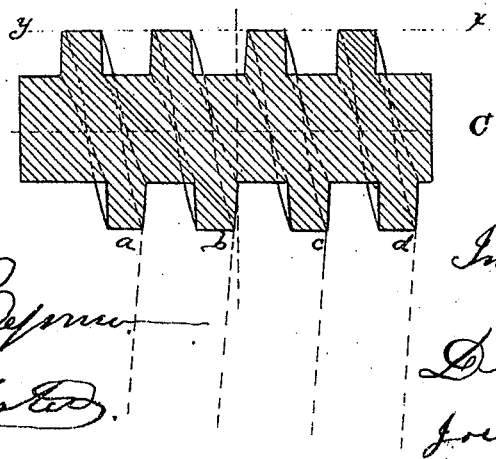

In these drawings, the letter A, Figure 1, represents a toothed wheel, of a common form, its face concave to adapt it to the reception of a worm. There is nothing new in the form of this wheel. In the driving endless screw or worm B, the following improvements are to be observed: In the ordinary endless screw, Figure 2, if line are drawn in the same plane from the axis of the screw to the circumference of the teeth or threads of the screw, through the middle of said threads, these lines will be found to be parallel; while lines drawn through the middle of the teeth of the driven wheel, which engages these threads, from the circumference inward, are convergent, and, in fact, radii of the wheel of which they are the teeth. Again, a line drawn along the outer edge of the threads of the ordinary worm, (line *x y*, fig. 2,) parallel to the axis, is a straight line, while a line drawn along the outer edge of the teeth of the driven wheel (*x y*, fig. 1) is an arc, of which the axis of the wheel is the centre. Hence it follows that but one tooth of the driven wheel is completely engaged at a time with the screw, that is, the tooth which is immediately perpendicular to the axis of the screw, the other teeth becoming less engaged with the screw-threads as they vary from the perpendicular; consequently, nearly the whole strain comes upon but one tooth, while that portion of the screw whose axis is perpendicular to a line drawn from the centre of the driven wheel to the screw is subjected to almost the whole of the wear of the teeth of the driven wheel, and is soon destroyed. In our invention, however, all these defects are avoided. Instead of the lines through the screw-threads being parallel, if drawn in the same plane from axis to circumference of driving-screw, these teeth are so cut that these lines will converge, and, if continued, would meet at a point distant from the base or root of the threads equal to the radius of the driven wheel. Thus, if lines be drawn from the axis of the screw B, fig. 1, through the middle of the threads *a b c d*, these lines would converge at a point, C, distant from the roots of the threads equal to the radius of the wheel A, and are, in fact, made by a tool, which, instead of travelling along the face of the screw a distance equal to the length thereof, vibrates on an axis whose radius is equal to that of the driven wheel. While, also, the threads of the common worm or screw are turned upon a cylinder, in our invention they may be turned upon a body whose surfaces from end to end of the screw, in a direction parallel with the axis, are concave, the radius of the concavity being equal to that of the driven wheel; and as the height of all the threads from root to summit is the same, it follows that they are concentric with the arc of the circumference of the driven wheel, and when the wheel and worm are placed together, that all the teeth of the wheel will enter to their full depth into the threads of the screw or worm; and as the driving-faces of the screw-threads are also made to correspond with the opposite faces of the teeth of the driven wheel, that all the teeth of the latter have an equal bearing in the threads of the screw, and that the strain on all the teeth and the wear on all the said threads will be equal, and a great addition to the strength of the former and to the durability of the latter is made.

What we claim, then, as our invention, is—

An endless screw or worm, with its threads so formed as to have their general direction from root to summit such that, if prolonged, they would meet at a point distant from the roots of the threads equal to the radii of the wheel they are intended to drive.

We claim, also, the forming of these threads upon a body whose bounding-lines, in a direction parallel with the axis of the worm, are concave, the radius of the concavity being equal, or nearly so, to the radius of the wheel to be driven.

DENNIS HARRIGAN,
JOEL WHITNEY

Witnesses:
WILLIAM PERKINS TYLER,
F. D. STEDMAN.